(12) United States Patent
Firey

(10) Patent No.: US 6,263,860 B1
(45) Date of Patent: Jul. 24, 2001

(54) INTAKE STRATIFIER APPARATUS

(76) Inventor: Joseph Carl Firey, P.O. Box 15514, Seattle, WA (US) 98115-0514

(*) Notice: Subject to any disclaimer, the term of this patent is extended or adjusted under 35 U.S.C. 154(b) by 0 days.

(21) Appl. No.: 09/617,008

(22) Filed: Jul. 14, 2000

(51) Int. Cl.$^7$ ............................................. F02B 17/00
(52) U.S. Cl. ................................... 123/430; 123/295
(58) Field of Search ............................. 123/430, 295, 123/530, 533, 298, 531, 504, 508, 250, 26, 305, 300

(56) References Cited

U.S. PATENT DOCUMENTS

| | | | |
|---|---|---|---|
| 5,456,232 | * 10/1995 | Firey | 123/430 |
| 5,899,188 | * 5/1999 | Firey | 123/250 |
| 5,899,195 | * 5/1999 | Firey | 123/531 |
| 5,931,123 | * 8/1999 | Firey | 123/25 C |
| 5,931,144 | * 8/1999 | Firey | 123/681 |
| 6,116,207 | * 9/2000 | Firey | 123/250 |

* cited by examiner

Primary Examiner—Henry C. Yuen
Assistant Examiner—Hieu T. Vo

(57) ABSTRACT

Within a displaceable enclosed volume, appreciably smaller than the engine displacement volume, a fuel-rich air fuel mixture is prepared. During the next engine intake process, this displacer mixture is pulsed into the engine intake air mass, to create a stratified air fuel mixture inside the engine cylinder.

Subsequent combustion of this stratified engine air fuel mixture can be knock free, thus permitting the use of very high intake supercharge for small displacement, low speed, and thus high mechanical efficiency engines.

By placement of insulating, air only portions, of the stratified engine air fuel mixture, against the engine cylinder head and piston crown, cooling jacket heat loss can be reduced, and fuel efficiency increased. In these ways, large improvements in vehicle miles per gallon can be achieved.

17 Claims, 5 Drawing Sheets

INTAKE STRATIFIER APPARATUS

CROSS REFERENCES TO RELATED APPLICATIONS

The invention described herein is related to my following U.S. Patent applications and issued U.S. Patents:

A. U.S. Patent application, "Fuel Air Mixer and Proportioner", Ser. No. 09/476891, filed Jan. 3, 2000, now U.S. Pat. No. 6,116,207, issued Sep. 12, 2000.

B. U.S. Pat. No. 5,9311,44, "Compensator For Manifold Fuel Injectors", issued Aug. 3, 1999;

C. U.S. Pat. No. 5,899,195, "Stratifier Apparatus For Engines", issued May 4, 1999;

D. U.S. Pat. No. 5,967,100, "Combustion Process For Compression Ignition Engines", issued Oct. 19, 1999;

E. U.S. Pat. No. 5,899,188, "Air Fuel Vapor Stratifier", issued May4, 1999;

F. U.S. Pat. No. 5,613,475, "Gasoline Fuel Injector Compensator", issued Mar. 25, 1997;

G. U.S. Pat. No. 5,483,937, "Actuator For Gasoline Fuel Injector System", issued Jan. 16, 1996;

H. U.S. Pat. No. 5,456,232, "Gasoline Fuel Injector System", issued Oct. 10, 1995;

I. U.S. Pat. No. 4,848,302, "Fuel Vaporizer For Creating Continuously Stratified Fuel Air Mixtures At Engine Intake", issued Jul. 18, 1989;

J. U.S. Pat. No. 4,425,892, "Further Improved Engine Intake Stratifier For Continuously Variable Stratified Mixtures", issued Jan. 17, 1984;

K. U.S. Pat. No. 4,205,647, "Engine Intake Fuel Fractionator and Stratifier", issued Jun. 3, 1980;

L. U.S. Pat. No. 4,147,137, "Engine Intake Stratifier", issued Apr. 3,1979;

BACKGROUND OF THE INVENTION

1. Field of the Invention

This invention is in the fields of air fuel mixture stratifiers for internal combustion engines of the piston and cylinder type, wherein a stratified principal air fuel mixture can be created in the engine intake manifold and thence transferred into the combustion chamber of the engine cylinder.

2. Description of the Prior Art

The Hesselman engine combustion process, and the more recent Texaco combustion process, are examples of early prior art air fuel mixture stratifiers, which created a stratified principal air fuel mixture in the engine combustion chamber. Descriptions of examples of these prior art mixture stratifier schemes are presented in the following references:

(i) "A High Power Spark-Ignition Fuel Injection Engine," Trans. SAE, Vol. 35, p.431, 1934;

(ii) "The Elimination of Combustion Knock-Texaco Combustion Process," SAE Quarterly Trans., Vol. 5, p.26, 1951;

(iii) "The Elimination of Combustion Knock," E. Barber, J. Malin, J. Mikita, Jour, of the Franklin Institute, Vol. 241, p.$^{275}$, April 1946;

In these prior art Texaco combustion processes, a jet of liquid fuel was injected in the engine combustion chamber, near the end of the compression stroke. The air inside the engine cylinder was set into rotary motion during intake, by use of shrouded intake valves, or specially oriented intake ports and manifolds. The liquid fuel spray was carried by the rotating air into which it was injected, toward a spark igniter. When this stratified air fuel mixture reached the spark, evaporated portions of the fuel, diffused into the surrounding air, were ignited by the spark, and a burning zone was thus created. The heat generated in this burning zone, evaporated those fuel portions unevaporated at the time of spark ignition and subsequent interdiffusion of air and thusly evaporated fuel maintained the burning zone, until most of the injected liquid fuel was burned. This burning process somewhat resembles that of a conventional liquid fuel oil burner, except that it is carried out intermittently and at high pressure.

Engine torque was adjusted, for this Texas combustion process, by proportionally adjusting the liquid fuel quantity injected into the engine cylinder, using fuel injection pumps and nozzles very similar to diesel engine injection pumps and nozzles. Since a stratified mixture was used, the air quantity inside the engine cylinder did not require adjustment, and an intake manifold throttle valve was not used. In consequence, the engine efficiency losses due to intake air throttling were avoided. Hence, another principal advantage of the Texaco combustion process was that high engine efficiency could be obtained at low engine torque since the usual throttling and consequent pumping power loss was avoided.

Liquid fuel, unevaporated at the start of burning, becomes surrounded by very hot burned gases, essentially devoid of oxygen. Rapid evaporation of liquid followed, but, in the absence of oxygen, this evaporated fuel produced a high yield of soot particles, in a manner similar to soot production in diesel engines. Appreciable portions of this soot survive to exhaust to create an undesirable exhaust soot emission.

The injected liquid fuel volume, being much smaller than the air volume needed for burning, it is difficult to distribute the liquid spray particles uniformly throughout the cylinder air mass. In consequence, the available cylinder air mass is incompletely utilized for burning. For this reason, a larger engine displacement is needed, resulting in increased engine weight and cost than for a comparable conventional gasoline engine.

The liquid fuel is injected at high pressure, and the fuel injector must withstand subsequent peak combustion pressures and the high heat transfer rates which follow. The fuel injection equipment is thus essentially similar to that used with conventional diesel engines and is expensive.

These then are the principal disadvantages of the Texaco combustion process; that exhaust soot is emitted, that a larger engine displacement is needed, and that expensive fuel injection equipment is required. It would be desirable to have available an engine system capable of realizing the knock suppression and reduced pumping friction loss characteristics of this Texaco combustion system, but producing reduced soot emissions, better air utilization, and lower cost fuel injection apparatus.

3. Definitions

The term, piston-type internal combustion engine, is used herein and in the claims to mean an internal combustion engine of the piston and cylinder type, with connecting rod and crankshaft or equivalent, such as the Wankel engine type, or opposed piston-type engines.

Each piston internal combustion engine comprises at least one combined means for compressing and expanding gases, each combined means comprising: an internal combustion engine mechanism comprising a variable volume chamber for compressing and expanding gases, and drive means, such as a connecting rod and crankshaft, for driving said internal combustion engine mechanism and varying the volume of said chamber through repeated cycles. Each variable volume chamber comprises a combustion chamber end at the minimum volume position of the variable volume.

Each variable volume cycle comprises a compression time interval, when said variable volume is sealed and decreasing, followed by an expansion time interval, when said variable volume is sealed and increasing, these two time intervals together being a compression and expansion time interval.

Each combined means for compressing and expanding further comprises intake means for admitting reactant gases into said variable volume chamber prior to each compression time interval and exhaust means for removing reacted gases from said variable volume chamber after each expansion time interval.

Each variable volume cycle further comprises an exhaust time interval, when said variable volume is opened to said exhaust means, followed by an intake time interval, when said variable volume is opened to said intake means, these two time intervals being an exhaust and intake time interval; said exhaust and intake time interval following after a preceding expansion time interval and preceding a next following compression time interval. For a four stroke cycle piston internal combustion engine each separate time interval occupies approximately one half engine revolution and thus one stroke of the piston. For a two stroke cycle piston internal combustion engine the expansion time interval together with the exhaust time interval occupy approximately a half engine revolution and one piston stroke, and an intake time interval followed by a compression time interval occupy the next following half engine revolution and piston stroke.

A piston internal combustion engine further comprises a source of reactant gas containing appreciable oxygen gas, such as air for supply to each said intake means for admitting reactant gases into said variable volume chamber.

A piston internal combustion engine further comprises an igniter for igniting fuel air mixtures contained within the combustion chamber of the variable volume chamber. Various types of igniters can be used, such as timed electric sparks, glow plugs, compression ignition via adequate engine compression ratio, and combinations of these igniters.

The combustion time interval is that portion of the compression and expansion time interval when ignition and burning of the air fuel mixture in the engine cylinder is intended to take place. For reasons of engine efficiency, this combustion time interval is preferably intended to occur when the variable volume chamber is at or near to its minimum volume, during or following a compression time interval.

The term reactant gas containing appreciable oxygen gas is used herein and in the claims to mean a reactant gas having a ratio of oxygen gas to inert gases at least about equal to that for air, and which may additionally comprise a principal engine fuel. Ordinary atmospheric air is the most common reactant gas containing appreciable oxygen gas.

Many different types of fuels are suitable for use on internal combustion engines equipped with intake stratifiers of this invention. The following are some examples of suitable commercial fuels:

1. Natural gas
2. Propane and butane
3. Gasoline
4. Diesel fuel and other middle distillate fuels
5. Producer gas
6. Water gas
7. Sewer gas
8. Other manufactured fuel gases In principal, any fuel which, when mixed with air or other oxygen rich gas in suitable proportion, can be spark ignited or compression ignited, is suitable for use with the invention described herein. The term stoichiometric mixture ratio is used herein and in the claims to mean that mixture ratio of fuel to oxygen which, if fully reacted, would produce only complete combustion products.

Hydrocarbon fuels are spark ignitable and flammable over a moderate range of mixture ratios, both fuel leaner and fuel richer than the stoichiometric mixture ratio. Most hydrocarbon fuels are also compression ignitable and over a wider range of mixture ratios than their spark ignitable mixture ratio range, provided adequate compression is used. Hydrocarbon fuels, undergoing compression ignition, exhibit a compression ignition time delay period, between application of compression and occurrence of ignition.

This compression ignition time delay period is shortest at mixture ratios at and near to stoichiometric, becoming longer for mixture ratios both leaner and richer than stoichiometric. The octane number, or cetane number, of a hydrocarbon fuel is an indicator of its compression ignition time delay characteristics, longer time delay being indicated by higher octane number or lower cetane number.

SUMMARY OF THE INVENTION

An intake stratifier apparatus of this invention injects fuel and air into a displaceable volume, appreciably smaller than the engine cylinder displacement volume. The resulting displacer air fuel mixture is then delivered, in pulses, into the engine intake manifold, to create a stratified air fuel mixture, during each engine intake process. This stratification of the engine intake mixture, largely survives the subsequent compression process, and acts during combustion to suppress knock and other compression ignition violence. Very high engine intake supercharge can thus be used, permitting the adoption of low displacement, low RPM, engines, whose friction power will be low, and whose mechanical efficiency will thus be high, even at low torque operation. This high mechanical efficiency of the engine, at low and moderate torque, translates into high miles per gallon for automobiles and trucks, and this is a principal beneficial object of this invention. Engine efficiency can be further improved by placing insulating, air only, regions of the stratified engine fuel air mixture, next to the engine cylinder head and piston crown. These insulation layers can reduce heat loss to the engine cooling jacket, and thus increase fuel efficiency. Additionally, unburned hydrocarbon emissions and piston ring belt deposits, which originate in these cylinder head and piston crown regions, will he reduced since fuel will not be present there.

BRIEF DESCRIPTION OF THE DRAWINGS:

An example form of intake stratifier apparatus, of this invention, is shown schematically in FIG. 1, on a four stroke cycle, compression ignition, internal combustion, engine.

A relative timing diagram is shown in FIG. 2 for the FIG. 1 example form of intake stratifier.

Figure 3:
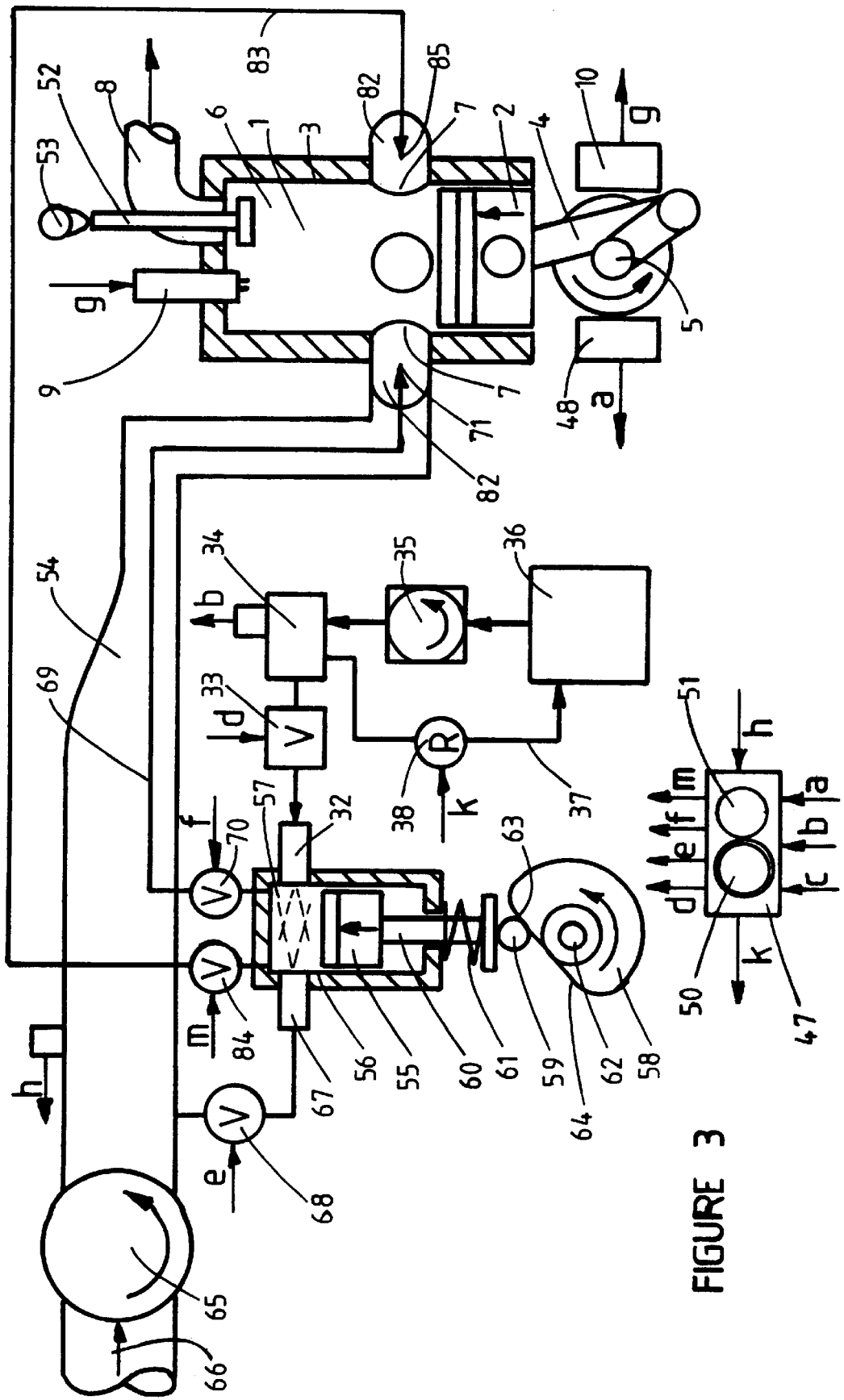

Another example form of intake stratifier apparatus, of this invention, is shown schematically in FIG. 3, on a two stroke cycle, spark ignition, internal combustion engine.

Figure 4:
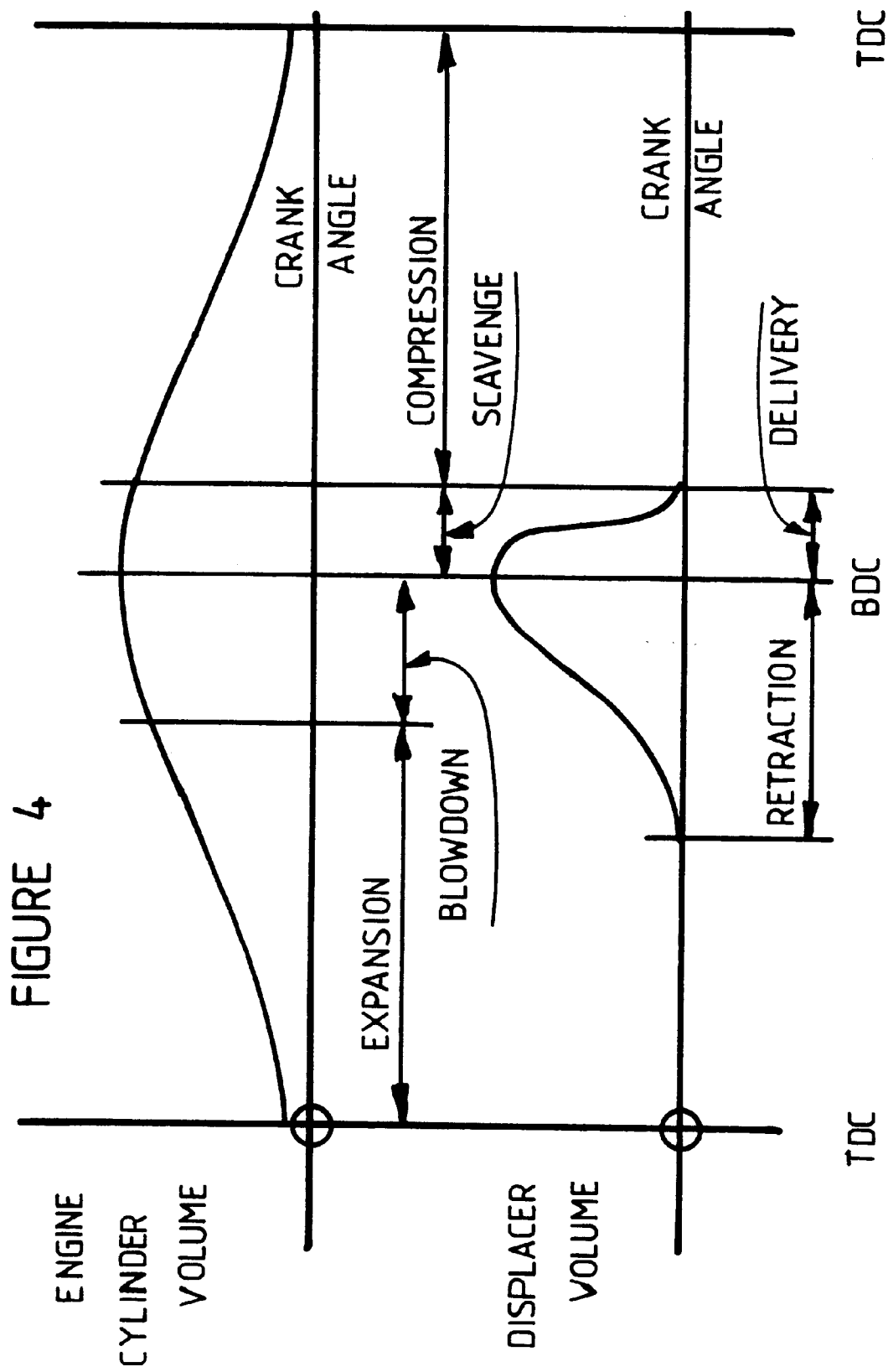

A relative timing diagram is shown in FIG. 4 for the FIG. 3 example form of intake stratifier.

Figure 5:
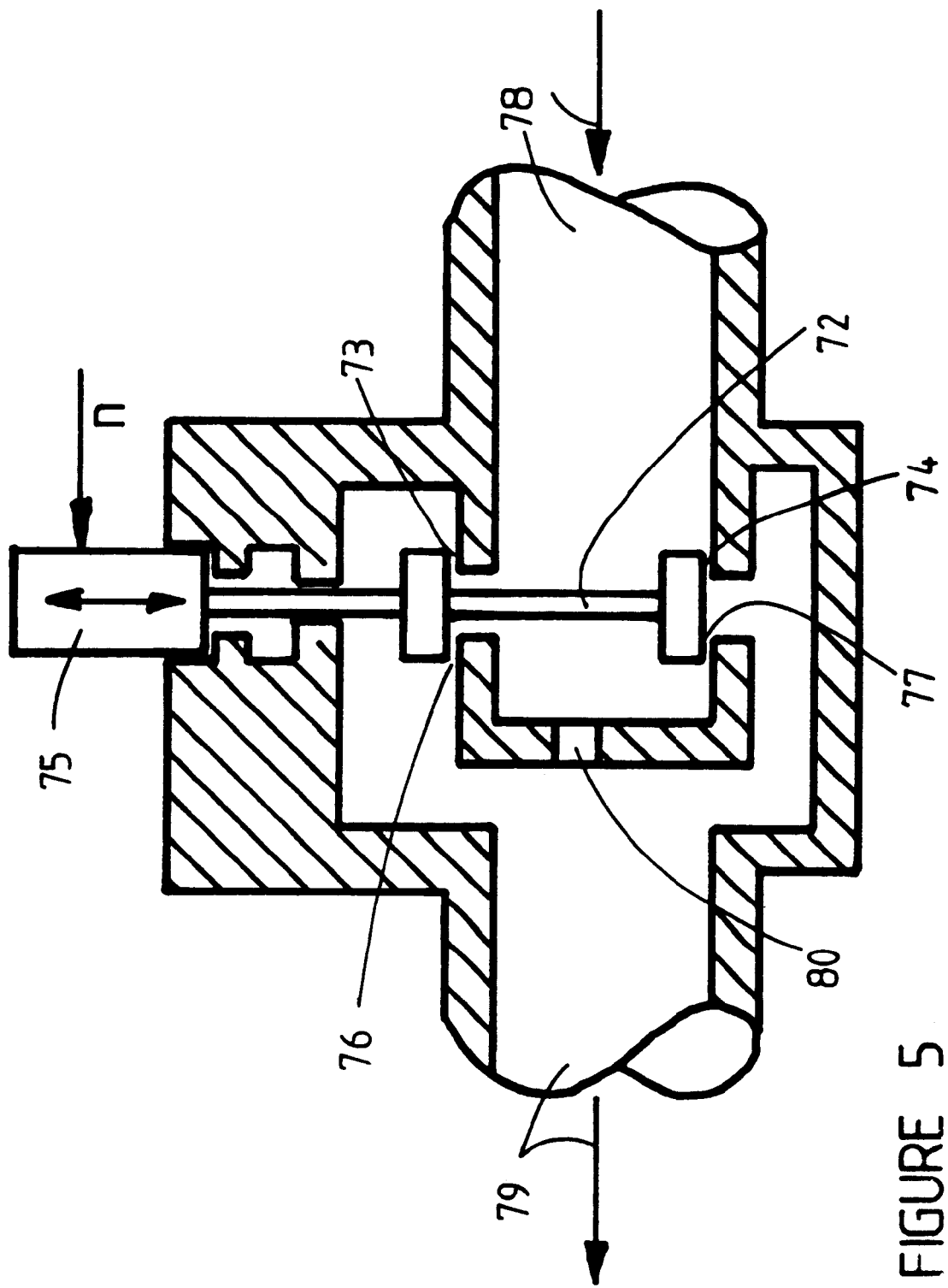

An example variable flow area valve is shown schematically in FIG. 5.

DESCRIPTION OF THE PREFERRED EMBODIMENTS

A. Elements and Operation of the Invention:

The intake stratifier apparatus of this invention is for use as an improved means for creating a stratified fuel and air mixture in the intake manifold of a piston type internal combustion engine, during the intake time interval of the engine cycle. Each cylinder of an engine is fitted with an engine intake manifold, connected to the intake means for supply of air into the engine variable volume chamber, and through which the intake air flows during the engine intake time interval. Each engine intake manifold has one or more connections to an intake stratifier apparatus of this invention, via displacer mixture transfer passages. Each intake stratifier apparatus of this invention comprises the following elements:

1. A moveable displacer piston operates sealably within a stationary displacer cylinder and these enclose a displacer volume;

2. A displacer piston driver mechanism can move the displacer piston in a retraction direction to increase the displacer volume and in a delivery direction to decrease the displacer volume;

The maximum displacer volume, at full retraction, is appreciably smaller than the engine displacement volume per engine cylinder; the minimum displacer volume, at full delivery, is preferably as small as mechanically feasible;

3. The displacer piston driver is coupled to the engine crankshaft, via a timer means, so that displacer piston motion is timed, relative to engine piston motion and cycle timing, as follows:
   a. Retraction motion starts after the end of the immediately preceding engine intake time interval, and ends before the start of the next following engine intake time interval;
   b. Delivery motion starts during this next following engine intake time interval and ends at or prior to the end of that same engine intake time interval;
   c. A complete sequence of displacer piston retraction motion, followed by displacer piston delivery motion, takes place for each engine cycle;

4. A fuel injector transfers fuel, from a fuel tank, and injects it into the displacer volume, while the displacer piston is being retracted; the fuel quantity thus injected for each engine cycle, is adjusted, in response to required engine torque, via an engine torque regulator acting on the fuel injector apparatus.

5. An air injector transfers air from a displacer air source, and injects it into the displacer volume, also while the displacer piston is being retracted; this air source can be the atmosphere, or the engine intake manifold, or a compressed air reservoir and air compressor, etc.;

6. Preferably fuel injection and air injection, into the displacer volume, occur at the same time, and in counterflow to each other, for better atomization of liquid fuel, and for mixing together of the injected fuel and air; in this way a displacer fuel in air mixture is created within the displacer volume during the retraction motion of the displacer piston;
   g. For the majority of engine applications, and for most engine operating conditions, the displacer air fuel mixture ratio is preferably fuel richer than the stoichiometric fuel air ratio;
   h. One or more displacer mixture transfer passages connect the displacer volume to the engine intake manifold, via displacer mixture transfer valves and actuators, for opening and closing the valve; each transfer passage comprising a transfer valve; the displacer mixture transfer valves are only opened during all, or a portion, of the time when delivery motion of the displacer piston is taking place, during the engine intake time interval;

7. The displacer mixture transfer passages connect into the engine intake manifold at positions where the volume of the portion of intake manifold, between these positions and the engine intake valve or port, is much less than the engine cylinder displacement volume; in this way, the displacer mixture being transferred into the engine intake manifold, during delivery motion of the displacer piston, will all be essentially completely swept into the engine variable volume chamber, during each intake time interval;

8. A controller acts upon the fuel injector, the air injector, and the displacer mixture transfer valve, and is responsive to engine cycle timing, and the torque regulator, to assure that:
   a. Fuel is injected into the displacer volume during the retraction motion of the displacer piston;
   b. Air is also injected into the displacer volume during displacer piston retraction;
   c. The displacer mixture is transferred from the displacer volume and into the engine intake manifold during the delivery motion of the displacer piston;
   d. The fuel quantity per engine cycle, thusly injected into the displacer volume is proportioned to the required engine torque;
   e. A wholly mechanical controller could comprise cam operated valves, for the fuel injector, the air injector, and the displacer mixture transfer valve. These cams could be gear-driven from the engine crankshaft, or camshaft, as a timer. Fuel quantity per engine cycle could be proportioned to engine torque by use of a variable volume fuel injector pump, such as the well known Bosch type injection pump;
   f. Alternatively, solenoid operated valves could be used on the fuel injector, the air injector, and the displacer mixture transfer valve. An electronic controller, with an electronic engine cycle timing sensor as an input, could open and close these solenoid valves, to carry out the required control functions. Fuel quantity per engine cycle could be proportioned to engine torque by adjusting the duration of opening of the fuel injector valve, as with a common rail fuel injection system. An advantage of such an electronic controller over a wholly mechanical controller, is that timing and duration of fuel injection, air injection, and displacer mixture transfer, can be more easily adjusted, as desired, while the engine is running.
   g. To achieve a highly stratified engine intake mixture in the engine intake manifold, the transfer of displacer mixture, from the displacer volume into the intake manifold, can occur in a series of several separate pulses, during each engine intake time interval, by action of the controller to open and close the displacer mixture transfer valve several times during each delivery motion of the displacer piston; in this way a primary stratification is created, in the engine intake manifold, comprising air only portions plus fuel rich displacer mixture portions;
   h. A secondary stratification can additionally be created, within the displacer mixture, by changing the ratio of instantaneous fuel injection rate, to instantaneous air injection rate, into the displacer volume, during displacer piston retraction; for example, the instantaneous fuel velocity of injection could be varied in pulses during each displacer piston retraction;

B. Survival of Intake Stratification:

That fuel air mixture stratification, existing in the engine intake manifold, will largely persist, through the intake and compression processes, and be present at the time of combustion is illustrated by the following experiment, carried out in a single cylinder, spark ignition, four stroke cycle, engine. Gasoline was injected into the intake manifold, during the intake stroke, as a short duration spray, from a conventional Bosch type injection pump and nozzle. The overall fuel to air ratio was essentially stoichiometric, and there was no intake throttle. The intake valve had a 180 degree shroud, oriented to cause a largely tangential flow of the intake mixture during intake. Spark ignition did not occur over a large portion of the engine cycle time before and after top dead center on the compression stroke, and could only be obtained over a rather narrow portion of the engine cycle time, in spite of the overall mixture ratio being well inside the spark ignition range of mixture ratio. The timing of the narrow spark ignitable band, relative to compression top dead center changed, when the timing of fuel injection during the intake stroke was changed.

The short duration of fuel injection created a small, very fuel rich, portion of mixture, within an otherwise essentially air alone intake charge.

This rich portion, rotating tangentially around the cylinder could only be ignited when it happened to be adjacent to the spark plug at the same time the spark was fired. Thus the stratified air fuel mixture, created in the intake manifold, persisted largely unchanged throughout the intake and compression processes, and was present to greatly affect combustion at the end of the compression process.

Other engine experiments showing that fuel in air stratification, existing in the engine intake manifold, survives the intake and compression processes, and is present at the time of combustion, are described in U.S. Pat. No. 4,147,137, col. 4 line 34, through col. 6, line 3, and this material is incorporated herein by reference thereto.

C. Beneficial Objects For Gasoline Engines:

Large improvements in automobile miles per gallon with spark ignited gasoline engines, can be achieved by reducing engine friction power losses. Gasoline engine friction losses result primarily from pumping work due to intake throttling at part load, and internal rubbing friction particularly between piston rings and cylinder. Both of these friction power losses can be greatly reduced, by use of the intake stratifier apparatus of this invention with a displacer mixture fuel richer than stoichiometric, as follows:

1. Engine torque is adjusted by adjusting only the fuel quantity. Hence throttling of the principal engine air mass, going into the variable volume chamber during intake, is not used at reduced torque output. Engine friction losses, due to pumping work, are thus avoided. Mixing and interdiffusion, between the fuel rich displacer mixture portions, and the air only portions, of the stratified intake mixture, will create spark ignitable zones, which are ignited by the spark igniters. The thusly spark initiated flames progress through the fuel containing regions, as interdiffusion continues to create mixture regions within the inflammable mixture ratio. In this way, essentially complete fuel burning can be achieved, even when overall mixture ratios are fuel leaner than the lean mixture inflammable limit, since stratification, and resulting fuel and air interdiffusion, continue to create zones which are within the inflammable limits, and burning continues within these zones.

2. Internal engine rubbing friction, as between piston rings and cylinder, can be reduced by use of small displacement engines, operated at low speeds. But such small displacement, low speed, engines have very poor torque and performance capabilities. High torque and performance can be restored to these small, low speed, engines by use of very high intake manifold supercharge, of the order of three to four atmospheres, with exhaust gas driven turbochargers.

In a gasoline engine, using conventional, largely unstratified, intake mixtures, such high supercharge at low engine speed would cause excessive engine knock, due to expiration of the compression ignition time delay, in as yet unburned mixture regions. But, where the fuel air mixture is stratified, these as yet unburned mixture regions are air alone, or fuel rich zones, possessing very long compression ignition time delay periods. Hence, use of stratified intake mixtures, suppresses occurrence of knock, even in highly supercharged, low speed, engines, possessing very low friction loss characteristics.

3. This is a principal beneficial object of the invention described herein, that automobile miles per gallon can be greatly improved by use of these intake stratifiers. Similar descriptions, of how these beneficial objects can be achieved, are presented in U.S. Pat. No. 5,899,195, col. 8, line 3, through line 22, and col. 21, line 27, through line 59, and this material is incorporated herein by reference thereto.

4. The intake stratifier apparatus, described herein, has the advantage over the stratifier apparatus for engines described in my U.S. Pat. No. 5,899,195, of mechanically simpler, and less expensive, apparatus, operated at lower pressures;

D. Beneficial Objects For Diesel Engines:

When adequately compressed, hydrocarbon fuel in air mixtures will self ignite, after a compression ignition time delay interval. The duration of this compression ignition time delay varies with fuel to air mixture ratio, being shortest at stoichiometric mixture ratio, and longer for mixtures both fuel leaner and fuel richer than stoichiometric. The compression ignition time delay becomes shorter as pressure rises during compression and combustion. In engine experiments where the entire fuel air mixture is of nearly the same air fuel ratio, and hence of the same compression ignition time delay, the occurrence of compression ignition can be extremely violent, since almost the entire mixture reacts fully in a very short time period. These violent compression ignitions create high engine noise levels, and can cause mechanical damage to the engine.

Conventional diesel engines achieve reasonably gradual compression ignition and burning, by creating air fuel ratio gradients around each atomized liquid particle, as fuel evaporates therefrom, and diffuses into the surrounding air. In this way compression ignition time delay gradients are created around each atomized liquid fuel particle.

Additionally, the liquid fuel is injected and atomized over an appreciable time interval. In consequence, many small separate regions are created, differing as to when their compression ignition time delay will expire, and ignition will occur. Compression ignition thus occurs at different times, in different places, in separate and small mixture regions. As a result, ignition and burning are reasonably gradual, and noise levels are acceptable for conventional diesel engines.

In a conventional diesel engine, liquid fuel, unevaporated at the time of compression ignition for each atomized particle, becomes surrounded with very high temperature burned gases, largely devoid of oxygen. The subsequent evaporation of this liquid is rapid, but its burning is slow, and incomplete, resulting in a high yield of soot particles. Appreciable portions of this soot survives to exhaust, to create an undesirable exhaust soot emission.

An intake stratifier apparatus of this invention, can be used, with a compression ignition engine, to achieve time and position dispersal of occurrence of compression ignition, similar to a conventional diesel engine, and thus to achieve gradual ignition, with acceptable combustion violence and noise levels. Additionally, the fuel is premixed and preevaporated into an air portion, and little or no liquid fuel remains when burning commences. As a result, little or no soot is formed, and exhaust smoke emissions can be much less than produced by conventional diesel engines.

For use in compression ignition engines, an intake stratifier of this invention will preferably transfer a large number of separate, small, pulses of fuel rich displacer mixture, into each intake air mass flowing through the intake manifold, during each intake time interval. Additionally, secondary stratification is preferably created within the displacer mixture itself, as described herein above. Interdiffusion from each separate primary stratification pulse, each of which has secondary stratification, into adjacent air portions, will create many small separate mixture regions, differing as to when their compression ignition time delay will expire, and ignition will occur. Compression ignition thus occurs at different times, in different places, in separate and small regions. In this way, the same reasonably gradual burning occurs, as in conventional diesel engines, and combustion violence and noise levels are acceptable.

These then are among the beneficial objects of this intake stratifier invention, when used with compression ignition engines:

a. Compression ignition can be reasonably gradual, with low combustion violence and noise;
b. Soot formation is much less than in conventional diesel engines, resulting in reduced exhaust smoke and odor emissions;
c. This reduced soot formation also reduces the formation of carbonaceous deposits on engine piston crowns, and on engine piston rings, thus reducing engine maintenance costs;

Similar beneficial objects are obtainable by use of the stratifier apparatus for engines described in my U.S. Pat. No. 5,899,195 in col. 22, line 9 through line 49, and this material is incorporated herein by reference thereto. The intake stratifier apparatus, described herein, is mechanically simpler, and operates at lower pressures, than the stratifier apparatus described in U.S. Pat. No. 5,899,195, and thus has the advantage of a lower cost and complexity.

Figure 1:
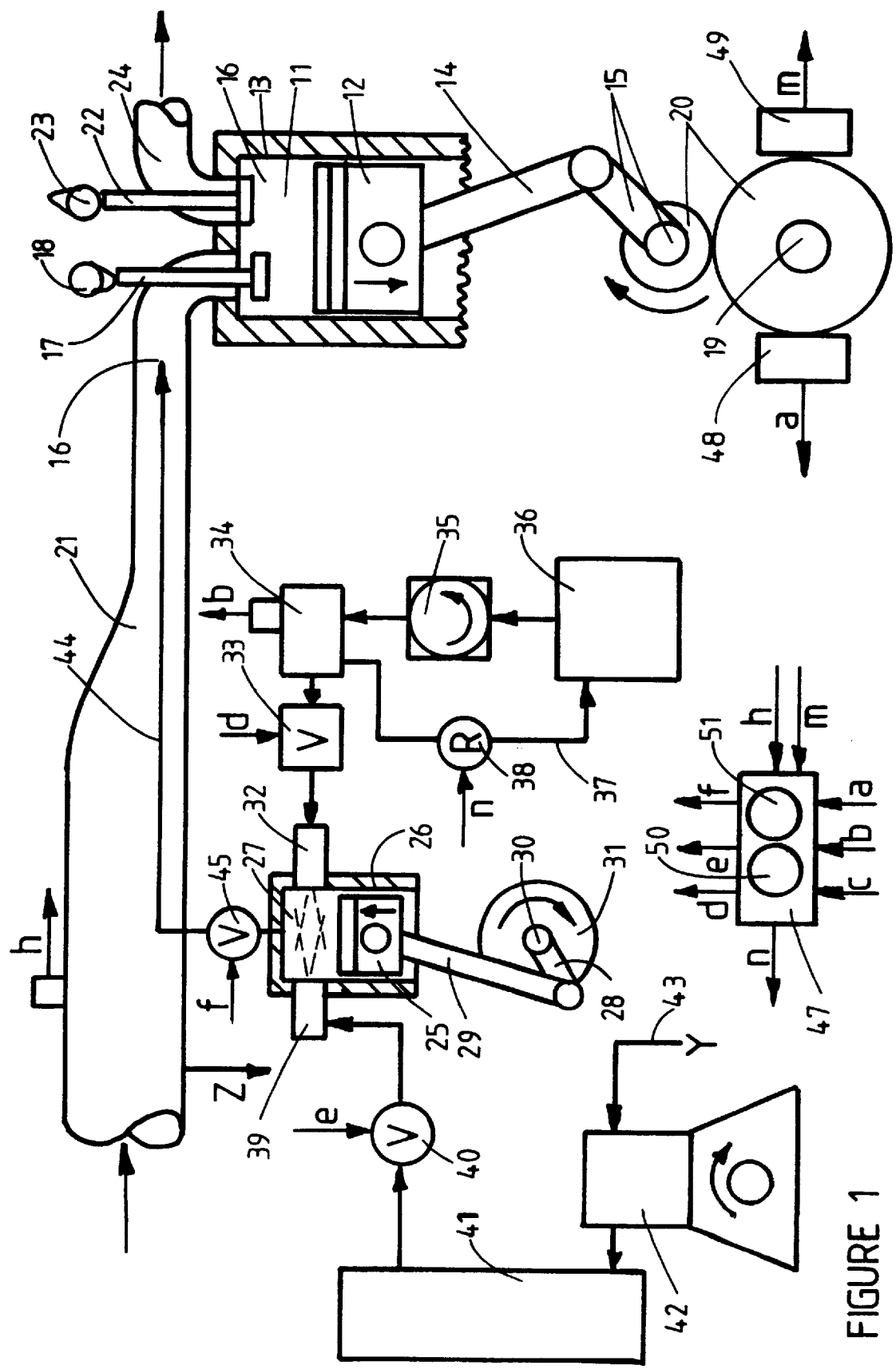
Figure 2:
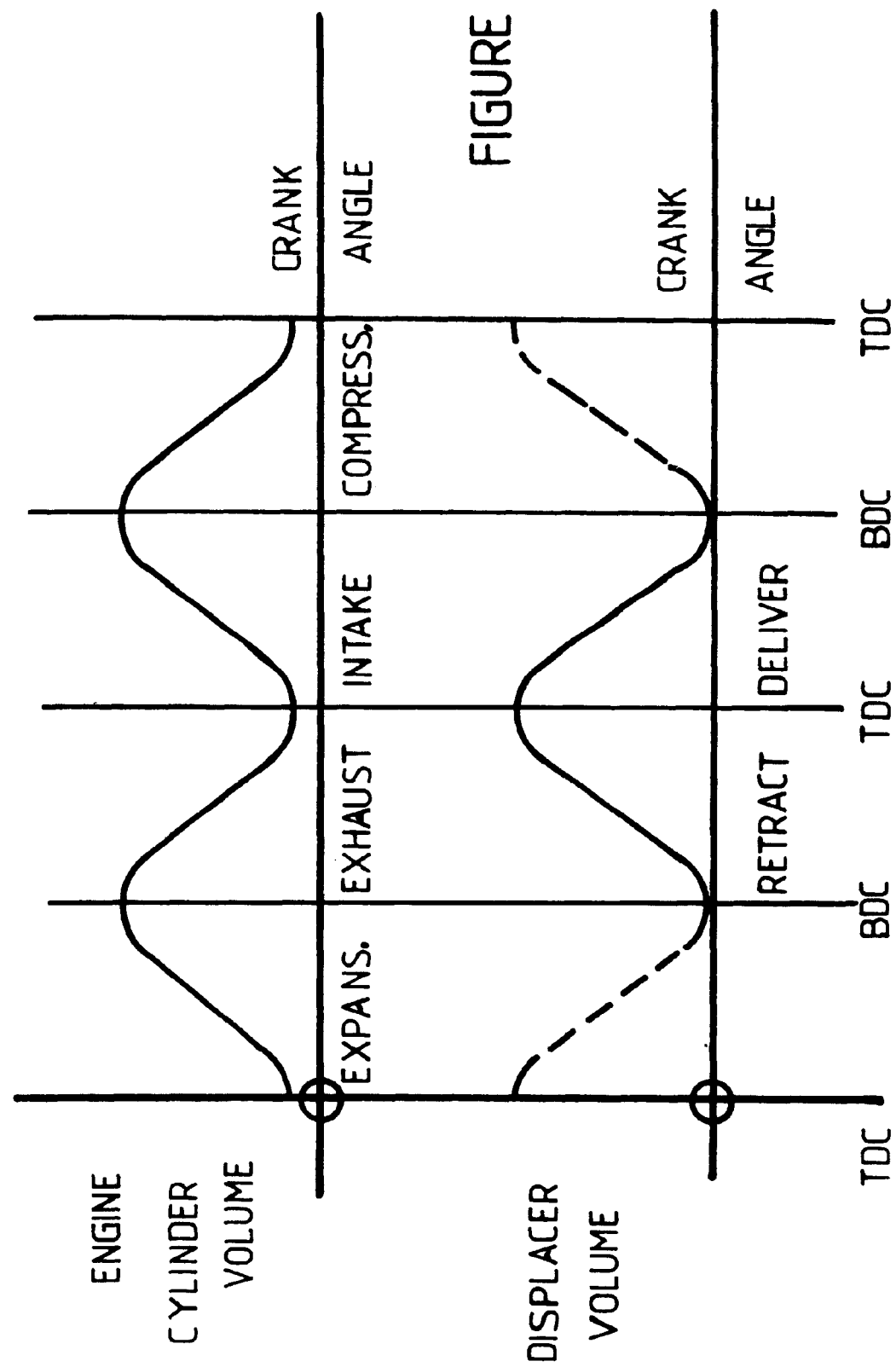

E. An Example Form of the Invention:

A particular example form of an intake stratifier apparatus of this invention is shown schematically in FIG. 1, on a four stroke, cycle, compression ignited, internal combustion engine. The relative timing of the engine piston and the displacer piston is illustrated on the diagram of FIG. 2. The four stroke cycle single cylinder engine of FIG. 1 comprises the following elements:

1. The variable volume chamber, 1 1, is enclosed by the engine piston, 12, and cylinder, 13. The piston, 12, is reciprocated by action of the internal combustion engine mechanism comprising a connecting rod, 14, and crank and crankshaft, 15. This piston motion creates a cycle of variation of the volume of the variable volume chamber, 11. When the piston is at top dead center, this minimum volume of the variable volume chamber defines the combustion chamber, end, 16, of this engine.

2. An engine intake time interval occurs when the intake valve, 17, is opened by the intake cam, 18, actuated by the camshaft, 19, driven via gears, 20, at half crankshaft speed, and the engine piston, 12, is descending to increase the variable volume, 11, as shown in FIG. 1. During this intake time interval engine intake air is drawn into the variable volume chamber, 11, via the open intake valve, 17, from the intake manifold, 21.

3. A compression time interval follows next after the intake time interval, with the intake valve, 17, and exhaust valve, 22, closed, and the piston, i 2, rising to decrease the variable volume, 1 1.

4. Compression ignition and burning of fuel air mixture occurs within the combustion chamber end, 16, of the variable volume chamber, commencing towards the end of the compression time interval as the piston, 12, is approaching and passing through top dead center.

5. An expansion time interval follows next after the compression time interval, with the intake valve, 17, and exhaust valve, 22, closed, and the piston, 12 descending to increase the variable volume, 11.

6. An engine exhaust time interval occurs when the exhaust valve, 22, is opened by the exhaust cam, 23, actuated also by the camshaft, 19, and the engine piston, 12, is rising to decrease the variable volume, 11. During this exhaust time interval burned gases are forced out of the variable volume chamber, 11, via the open exhaust valve, 22, into the exhaust pipe, 24.

7. The intake time interval for the next following engine cycle commences after the exhaust time interval. Each engine cylinder and variable volume chamber, 11, is connected via its intake manifold, 21, to an intake stratifier apparatus of this invention, which comprises the following elements:

8. The displacer piston, 25, operates within the displacer cylinder, 26, to vary the displacer volume, 27, and is driven by the crank, 28, connecting rod, 29, and displacer crankshaft, 30, driver mechanism whose timer gear, 31, rotates the displacer crankshaft, 30, at engine crankshaft, 15, speed, and times displacer piston, 25, motion relative to engine piston, 12, motion so that, when the variable volume, 11, is increasing, the displacer volume, 27, is decreasing with a delivery motion as shown in FIG. 1. Also, the displacer piston, 25, motion is timed relative to the engine piston, 12, motion, so that, when the variable volume, 11, is decreasing, the displacer volume, 27, is increasing with a retraction motion.

9. This timing of displacer piston, 25, delivery motion and retraction motion, relative to engine piston motion is shown on the related timing diagrams of FIG. 2, wherein variable volume, 11, is plotted against engine crank angle, CA, in the upper diagram, and displacer volume, 27, is plotted also against engine crank angle, CA, in the lower, time related, diagram. Note that delivery motion of the displacer piston, 25, is concurrent with an intake time interval of the variable volume, 11. Also a retraction motion of the displacer piston, 25, precedes this engine intake time interval.

10. An example common rail fuel injection system is shown schematically in FIG. 1 and comprises: a fuel injector, 32, connected via a fuel control valve, 33, to the common rail, 34, into which the engine driven fuel pump, 35, pumps fuel from a fuel source, 36, at a rate well in excess of the fuel flow to the engine, this excess fuel returning to the fuel source, 36, via the passage, 37, with flow restriction, 38. The flow restriction, 38, is sized relative to the fuel pump, 35, so that an adequate fuel atomization pressure is obtained in the common rail, 34, when the liquid fuel is injected into the displacer volume, 27, via the fuel injector, 32, when the fuel valve, 33 is open and the displacer piston, 25, is being retracted;

11. An example air injector system is shown schematically in FIG. 1, and comprises: an air injector, 39, connected via an air control valve, 40, to the displacer air tank, 41, into which the engine driven air compressor, 42, pumps air from a compressor air source, 43, such as the atmosphere, or the engine intake manifold, 21. the air compressor, 42, capacity is sized, relative to the air flow into the displacer volume, 27, so that an adequate air flow velocity is obtained when the displacer air is injected into the displacer volume, 27, when the air valve, 40, is open and the displacer piston, 25, is being retracted;

12. Preferably air injection and fuel injection into the displacer volume, 27, occur concurrently, and with opposed flow, as shown in FIG. 1, in order to obtain maximum fuel atomization, and mixing with the injected air. In this way a displacer fuel air mixture is created within the displacer volume, while the displacer piston, 25, is being retracted, prior to the next engine intake time interval;

13. The displacer mixture transfer passage, 44, connects the displacer volume, 27, to the engine intake manifold, 21, via a displacer mixture transfer valve and actuator, 45. The displacer mixture transfer valve, 45, is opened and closed so that displacer mixture is transferred therethrough, from the displacer volume, 27, into the intake manifold, 21, only during the engine intake time interval, when the displacer piston, 25 is in delivery motion, and the displacer mixture transfer valve, 45, is open; preferably the displacer mixture is thusly transferred into the engine intake manifold, in a series of several separate pulses, during each intake time interval, by opening and closing the displacer mixture transfer valve several times. In this way a highly stratified engine intake fuel air mixture can be created, comprising alternate air only zones, and fuel rich displacer mixture zones;

14. The displacer mixture is transferred into the engine intake manifold, 21, at a position therein, 46, where the intake manifold volume between that position, 46, and the engine intake valve, 17, is much smaller than the maximum volume of the variable volume chamber, 11. In this way, all portions of the displacer mixture, transferred into the intake manifold, will also be swept into the variable volume chamber, 11, during each intake time interval;

15. The example electronic controller, 47, receives an engine cycle timing input, a, from a cycle timing sensor, 48, on the engine camshaft, 19, and an engine torque requirement input, c, from the engine torque regulator, and is operative upon solenoid actuated fuel injector valve, 33, via output, d, and displacer mixture transfer valve, 45, via output, f, and upon air injector valve, 40, via output, e, so that:

a. Fuel and air are injected into the displacer volume, 27, only during displacer piston retraction motion;
   b. Displacer mixture is transferred into the engine intake manifold, 21, only during displacer piston delivery motion;
   c. The fuel quantity injected into the displacer volume, per engine cycle, is proportioned to required engine torque, as for example, by adjusting the duration of fuel injection per engine cycle;

16. The controller, 47, may additionally comprise an engine speed sensor, 49, with input, m, and an adjustor, 50, so that the controller can cause the displacer mixture transfer valve, 45, to open and close several times, during each engine intake time interval, and thus to create several separate pulses of displacer mixture flow into the engine intake manifold. A primary stratification of the engine intake mixture is thusly created, comprising several fuel rich displacer mixture zones, separated by air only zones. The number of pulses per engine intake time interval, as well as the duration of each pulse, can be adjusted via the adjustor, 50, in response to changes in the type of fuel being used, and also to changes in engine operating conditions;

17. The intake stratifier apparatus, as shown in FIG. 1, is serving a single cylinder, four stroke cycle, engine. But this same example single intake stratifier could additionally serve a second engine cylinder, while the first engine cylinder is passing through its compression and expansion time intervals, as shown by the dashed portion of the displacer volume graph on FIG. 2.

F. Another Example Form of the Invention:

Another particular example form of an intake stratifier apparatus of this invention is shown schematically in FIG. 3, on a two stroke cycle, spark ignited, internal combustion engine. The relative timing of the engine piston and the displacer piston is illustrated on the diagram of FIG. 4. The two stroke cycle, single cylinder engine of FIG. 3 comprises the following elements:

1. The variable volume chamber, 1, is enclosed by the piston, 2, and cylinder, 3. The piston, 1, is reciprocated by action of the internal combustion engine mechanism comprising a connecting rod, 4, and crank and crankshaft, 5. This piston motion creates a cycle of variation of the volume of the variable volume chamber, 1. When the piston is at top dead center, this minimum volume of the variable volume defines the combustion chamber end, 6, of this engine.

2. The two stroke cycle engine of FIG. 1 comprises several intake ports, 7, through which engine intake air for combustion is supplied into the variable volume chamber during an intake time interval when the piston, 2, has uncovered the intake ports, 7.

3. The engine of FIG. 1 further comprises an exhaust port, 8, through which burned gases leave the variable volume chamber during an exhaust time interval, when the exhaust valve, 52, is opened by the exhaust cam, 53;

4. On the piston upstroke, the air inside the variable volume, 1, is compressed, after the intake ports, 7, are covered by the piston, 2, and the exhaust valve, 52, is closed, during a compression time interval;

5. On the next piston downstroke, the burned gases inside the variable volume, 1, are expanded, during an expansion time interval, which ends when the exhaust valve, 52, is opened to commence the next exhaust time interval;

6. Whenever fuel from any source and air are both present within the variable volume chamber, combustion can take place during such a potential combustion time interval. The actual combustion time interval commences when this fuel air mixture is ignited, as by a spark at spark electrodes 9, energized from a spark energizer and timer, 10. For reasons of engine cycle efficiency the combustion time interval preferably commences during the latter portions of the compression time interval and ends during the early portions of the expansion time intervals, and the spark energizer, 10, is timed accordingly; Each engine cylinder and variable volume chamber, 1, is connected via a branch from its intake manifold ports belt, 82, to an intake stratifier apparatus of this invention, which comprises the following elements:

7. The displacer piston, 55, operates within the displacer cylinder, 56, to vary the displacer volume, 57, and is driven by the displacer cam, 58, cam follower, 59, piston rod, 60, and retract spring, 61, driver mechanism, whose timer gear, 62, rotates the displacer cam, 58, at engine crankshaft, 5, speed and times displacer piston, 55, motion, relative to engine piston, 2, motion, so that, displacer volume, 57, is decreasing, with a delivery motion, as shown in FIG. 3, when the intake port, 7, is uncovered by the engine piston, 2, during the intake time interval. This delivery motion of the displacer piston, 55, is caused by the delivery portion, 63, of the displacer cam, 58, and it completed during the engine intake time interval. Also the displacer piston, 55, motion is timed, relative to the engine piston, 2, motion, so that, when the intake port, 7, is covered by the engine piston, 2, the displacer volume, 57, is increased by retraction caused by the retract spring, 61, and retract portion, 64, of the displacer cam, 58. This retraction motion of the displacer piston, 55, is completed prior to the start of the engine intake time interval;

8. This timing of displacer piston, 55, delivery motion and retraction motion, relative to engine piston, 2, motion is shown on the related timing diagrams of FIG. 4, wherein variable volume, 1, is plotted against engine crank angle, CA, in the upper diagram, and displacer volume, 57, is plotted also against engine crank angle, CA, in the lower, time related, diagram.

9. The example common rail fuel injection system, shown in FIG. 3, is similar to the fuel injection system shown in FIG. 1, and also comprises: a fuel injector, 32, fuel control valve, 33, common rail, 34, engine driven fuel pump, 35, fuel source, 36, and flow restriction, 38. These elements of the common rail fuel injection system of FIG. 3, operate in the same manner, as described hereinabove for the FIG. 1 form of the invention, to inject fuel into the displacer volume, 57, when the displacer piston, 55, is being retracted;

10. The engine intake manifold, 54, of FIG. 3, is supplied with engine intake air compressed by the supercharger, 65, to a pressure well above the atmospheric pressure at supercharger inlet, 66. The supercharger, 65, can be an engine driven compressor or an engine exhaust gas driven turbocharger for example;

11. The air injection system of FIG. 3 comprises an air injector, 67, connected via an air control valve, 68, to the engine intake manifold, 54, downstream in the direction of intake air flow, from the intake supercharger, 65. When the displacer piston, 55, is being retracted, the air control valve, 68, is opened, and a portion of compressed air is transferred from the intake manifold, 54, into the displacer volume, 57.

12. Preferably air and fuel injection into the displacer volume occur concurrently, to create a well mixed displacer fuel air mixture therein, during displacer piston retraction, as described herein above for the FIG. 1 form of the invention;

13. Two displacer mixture transfer passages, 69, 83, with separate displacer mixture transfer valves and actuators, 70, 84, respectively, connect the displacer volume, 57, to the intake manifold ports belt, 82, at two different places, 71, 85, respectively. The displacer mixture transfer valves, 70, 84, are opened and closed so that displacer mixture is transferred from the displacer volume, 57, into the intake manifold ports belt, 82, only when the displacer piston, 55, is in delivery motion during the engine intake time interval. The displacer mixture enters the intake manifold ports belt, 82, at positions 71, 85, where the intake manifold volume between these positions, 71, 85, and the engine intake ports, 7, is much smaller than the maximum volume of the variable volume chamber, 1, so that essentially the entire transferred displacer volume is swept into the variable volume chamber during each intake time interval;

14. The electronic controller, 47, with cycle timing sensor, 48, input, a, and engine torque regulator input, c, operates on the fuel injector valve, 33, air injector valve, 68, and displacer mixture transfer valves, 70, 84, in the same manner, as described hereinabove for the FIG. 1 form of the invention, so that: fuel and air are injected into the displacer volume during displacer piston retraction; displacer mixture is transferred into the engine intake manifold ports belt during displacer piston delivery motion; fuel quantity per engine cycle, injected into the displacer volume is proportioned to required engine torque.

15. The controller, 47, may additionally function to cause displacer mixture transfer to occur in several separate pulses into the engine intake manifold, to create a primary stratification within each engine intake mixture, as described hereinabove for the FIG. 1 form of the invention. By alternating the pulsed openings and closings of the two separate displacer mixture transfer valves, 70, 84, an additional degree of primary stratification can be created in the intake manifold ports belt, 82, since the two separate transfer passages, 69, 83, connect into the intake manifold ports belt, 82, at two different positions, 71, 85.

16. The controller, 47, may further additionally function to cause fuel injection to occur in several pulses into the displacer volume, to create a secondary stratification within each displacer mixture, as described hereinabove for the FIG. 1 form of the invention.

17. For a two stroke cycle engine, as shown in FIG. 3, each example intake stratifier apparatus, as shown in FIG. 3, can serve each engine cylinder as shown in FIG. 4.

18. The two stroke cycle engine, shown in FIG. 3, utilizes uniflow scavenging during the exhaust and intake time intervals, wherein, as fresh intake mixture enters the variable volume, 1, via the several intake ports, 7, during the intake time interval, when the engine piston, 2, is passing through bottom dead center, exhaust gas concurrently leaves the variable volume chamber, 1, via the then open exhaust valve, 52. The supercharge pressure, in the intake manifold, 54, forces this scavenging process along, but may also push unburned fuel air mixture out, via the exhaust valve, with consequent reduced engine fuel efficiency. To avoid such loss of unburned fuel air mixture to exhaust, the exhaust valve, 52, is preferably closed before the intake ports, 7, are again covered at the start of the next compression time interval. Additionally, with an intake stratifier of this invention, the transfer of displacer mixture into the engine intake manifold can be delayed briefly, by the controller, 47, at the start of the intake time interval. This delayed transfer results in the first intake mixture to enter the variable volume chamber, 1, being air alone, and this will also be the intake mixture portion most likely to leave, via the exhaust valve, during scavenging. In this way loss of fuel, unburned, into exhaust during scavenging, can be further reduced and largely eliminated.

G. Modified Elements:
1. A conventional piston and cylinder displacer is shown in FIG. 1 and FIG. 3. But other, equivalent, types of displacers can also be used, for the purposes of this invention, such as vane type compressor displacers;
2. A common rail fuel injection system is shown in FIG. 1 and FIG. 3. But other, equivalent types of fuel injection systems can also be used, for the purposes of this invention, such as conventional, Bosch type, variable volume, fuel pump and injector systems;
3. In the example forms of the invention, shown in FIG. 1 and FIG. 3, a single intake stratifier apparatus is shown serving a single engine cylinder. But each stratifier apparatus can usually serve more than one cylinder of a multicylinder engine, subject to the following restrictions:
   a. The displacer piston delivery time interval preferably essentially equals the engine intake time interval, so that full air utilization is possible at maximum engine torque output;
   b. The maximum number of engine cylinders served by each in intake stratifier apparatus is that integral number, no greater than the ratio of engine cycle time interval, divided by displacer piston retraction plus delivery time intervals; Engine cycle time interval is the sum of intake, compression, expansion, and exhaust time intervals.

H. Secondary Stratification:

In some engine applications it may be preferable to utilize, not only primary stratification, within the engine intake mixture, but, additionally, secondary stratification within the displacer mixture. Such primary plus secondary stratification can be used to greatly reduce the violence of compression ignition initiation of burning in engines. Such secondary stratification of the displacer mixture can be created by varying the ratio of instantaneous fuel injection rate, to instantaneous air injection rate, into the displacer volume, during each retraction of the displacer piston. An example variable flow area valve is shown in FIG. 5, and FIG. 1, which could be used either as the air control valve, 40, in FIG. 1, or alternatively, as the fuel return flow restriction, 38, in FIG. 1, to create this desired variation of fuel, flow rate to air flow rate during each retraction of the displacer piston, 25.

The variable flow area valve of FIG. 5 comprises the following elements:
1. The pressure balanced valve element, 72, comprises an upper seat, 73, and a lower seat, 74;
2. The valve element, 72, can be vibrated by the solenoid driver, 75, which receives variable energizing, n, from the controller, 47, during displacer piston retraction. The two valve flow areas, 76, 77, are thusly varied during retraction; this variation of flow area causes a variation of instantaneous flow velocity, from valve inlet, 78, to valve outlet, 79, of either the air, or the fuel, flowing into the displacer volume, 27. In this way a secondary stratification of fuel air mixture can be created in the displacer mixture;
3. If complete stoppage, of either air flow, or fuel flow, into the displacer volume, is to be avoided during displacer piston retraction, the two valve flow areas can always be greater than zero, throughout the full range of vibration of the valve element, 72. Alternatively, a small bleed flow passage, 80, can be provided between valve inlet, 78, and valve outlet, 79. For this case, an additional series air control valve element may be preferred, which fully stops air flow into the displacer volume, but is open during displacer piston retraction.

I. Stratification Patterns

Various fuel in air stratification patterns can be created in the engine intake manifold, and thus in the variable volume chamber of the engine, by use of the intake stratifier apparatus of this invention. Additionally, the stratification pattern can be changed, in response to changes in engine operating conditions or changes in the fuel being used. The following examples illustrate some types of stratification pattern, and the benefits achievable by their use.
1. Placing two, separate, air only, insulating blankets immediately adjacent to both the engine piston crown, and the engine cylinder head, would reduce heat loss to the engine cooling jacket, and thus increase the engine fuel efficiency. A partially adiabatic engine is thus achieved, using air as the insulating layer, instead of solid ceramic materials, as used in earlier adiabatic engines, such as described in the references: *"Ceramics for Adiabatic Diesel Engines,"* R. Kamo, M. Woods, and W. Geary, CIMTECH, 4$^{th}$, June 1979; *"Thermal Barrier Coating for Diesel Engine Piston,* R. Kamo, M. Woods, T. Yamada, and M. Mori, ASME Paper 80-DGP-14, 1980.

For the example two stroke cycle engine, with uniflow scavenging, shown in FIG. 3, these two, air only, insulating blankets could be created as follows:
   a. During the start of the engine intake time interval, displacer mixture transfer into the intake manifold ports belt, 82, is delayed until a first air only portion has already entered the engine variable volume chamber, 1. With uniflow scavenging, this first air only portion will tend to become positioned against the engine cylinder head after the exhaust valve, 52, has closed. An air insulating blanket may thus be placed against the cylinder head.
   b. Towards the end of the engine intake time interval, displacer mixture transfer into the intake manifold ports belt, 82, ceases before the end of the intake time interval so that a second air only portion is last to enter the engine variable volume chamber, 1. This second air only portion will tend to become positioned against the engine piston crown. Another air insulating blanket may thus be placed against the piston crown.
   c. In similar fashion, two separate air only insulating blankets can be created in the four stroke cycle engine example shown in FIG. 1, except that the first air only portion will tend to become positioned against the piston crown, whereas the second air only portion will tend to become positioned against the cylinder head.
   d. The cylinder head surface, the piston crown surface, and the piston ring belt crevice region, are important sources for unburned hydrocarbon exhaust emissions, and also for fuel generated ring belt deposit materials, since fuel burning is quenched in these regions. By placing air only blankets, free of fuel, against these surfaces, exhaust emissions of unburned hydrocarbons, and accumulation of piston ring belt deposits, can be reduced.

These are additional beneficial objects, achievable by using the intake stratifier apparatus of this invention, to create an air insulating blanket pattern of stratification.

2. For spark ignition engines, as engine speed is increased, and fuel air mixture residence time in the variable volume chamber is reduced, the need for knock suppressing mixture stratification is reduced. Engine intake mixture stratification can be reduced in various ways, for an intake stratifier apparatus of this invention. For example, where displacer mixture transfer into the engine intake manifold is pulsed, the crank angle duration of each pulse can be progressively increased while shortening the crank angle interval between pulses, as engine speed increases, thus creating smaller air only regions and a more nearly uniform engine intake mixture. More complete combustion utilization of available air can be obtained, from such more nearly uniform engine intake mixture, resulting in increased torque capacity from a given engine displacement.

3. Supplementary fuel, in addition to, and separate from, the fuel injected into the displacer volume, can also be used, with the intake stratifier apparatus of this invention for various purposes, such as to achieve more complete utilization of available air for combustion. Such supplementary fuel can be introduced directly into the engine intake manifold or injected directly into the engine variable volume chamber.

4. Engines operated over a very wide range of output torque and engine speed, such as automobile engines, may preferably be capable of using several differing stratification patterns, each pattern being best suited to a particular set of operating conditions. For these engines, an electronic controller element will probably be preferred over a mechanical controller, since electronic sensors can be more readily used, and stratification patterns can be more easily changed.

J. Sizing a. The required maximum displacer volume, relative to the engine cylinder volume, can be estimated from the following approximate relations for those cases where all engine fuel passes first through the displacer volume, as shown in FIG. 1 and FIG. 3 examples:

$$\frac{(VAM)}{(VD)} = \frac{(DAI)(ev)}{(DADM)(evd)} \frac{(ERDM)}{(EREM)}$$

Wherein:
(VAM)=Maximum displacer volume at full retraction;
(VD)=Engine displacement volume per cylinder;
(DAI)=Engine intake air density;
(ev)=Engine volumetric efficiency, fractional;
(DADM)=Maximum displacer air density;
(evd)=Displacer volumetric efficiency, fractional;
(ERDM)=Displacer mixture equivalence ratio at maximum engine torque;
(EREM)=Overall engine mixture equivalence ratio at maximum engine torque;

$$(EREM) = \frac{(MAM)}{(MFM)(SAF)}$$

$$(ERDM) = \frac{(MDAM)}{(MFM)(SAF)}$$

(MAM)=Total engine air mass per cycle;
(MAM)=(VD)(DAI)(ev)
(MFM)=Total engine fuel mass per cycle at maximum engine torque output;

$$(MFM) = \frac{(BHPM)}{(EI)(CPM)(LHV)(EM)}$$

(BHPM)=Maximum design engine power output;
(CPM)=Engine cycles per unit of time;
(EI)=Engine indicated thermal efficiency, fractional;
(EM)=Engine mechanical efficiency, fractional;
(LHV)=Heating value of engine fuel;
(SAF)=Stoichiometric ratio of air mass divided by fuel mass;
(MDAM)=Maximum displacer air mass per engine cycle at maximum engine torque output;

Any consistent system of units can be used in these approximate relations:

b. The sizing estimate can be initiated via various different preselected values. For example, values can be preselected for the displacer mixture equivalence ratio, (ERDM), and the overall engine mixture equivalence ratio (EREM), within the following constraints:

1. The fuel richest value of overall engine mixture equivalence ratio (EREM), will most commonly be somewhat greater than 1.0; Larger, and hence fuel leaner, values will require larger and heavier, and more costly engines, for the same torque output, since air utilization is less complete;

2. The fuel leanest value of overall displacer mixture equivalence ratio (ERDM), will be less than 1.0; smaller values of (ERDM) mean a fuel richer displacer mixture, and thus a potential for increased soot formation during combustion. But smaller values of (ERDM) can also mean a more highly stratified engine intake mixture, and thus a potential for reduced combustion violence and engine noise. A design compromise is thus to be struck between engine noise and exhaust smoke emissions. The compression ignition time delay properties of the fuel to be used also affects the best value for displacer mixture equivalence ratio (ERDM). Larger values of (ERDM) can usually be used, with fuels possessing a longer compression ignition time delay characteristic, such as higher octane fuels, for the same level of combustion violence and noise. Thus higher octane fuels may permit operation at reduced exhaust smoke emissions;

c. The displacer air supply and fuel supply can be sized from the following approximate relations, for the FIG. 1 example form of the invention, using a crank and connecting rod displacer piston driver:

$$\frac{(MDAM)}{(MFM)} = \frac{(VDA)(KA)(ea)(dai)(AR)(CR)}{(KP)(AF)(CF)} \frac{(ACA)}{(FCA)}$$

Wherein:
(VDA)=Displacement of air compressor, 42;
(ea)=Air compressor volumetric efficiency fractional;
(dai)=Air density at air compressor inlet, 43;
(KA)=Ratio of air compressor speed to engine crankshaft speed;
(ACA)=Crank angle duration of air flow into displacer volume, per engine cycle, radians; at maximum torque essentially equal to pi radians for the four stroke cycle engine of FIG. 1;
(FCA)=Crank angle duration of fuel injection into displacer volume, per engine cycle, radians; at maximum torque and preferably equal to (ACA) at pi radians;
(AR)=Flow area of common rail fuel system flow restriction, 38;
(CR)=Flow coefficient of common rail fuel system flow restriction, 38;
(AF)=Fuel injection nozzle flow area;
(CF)=Fuel injection nozzle flow coefficient
(KP)=(VDF) (df) (KF)
(VDF)=Displacement per revaluation of fuel pump, 35;
(df)=Fuel density;
(KF)=Ratio of fuel pump speed to engine crankshaft speed;

$$\frac{(MDAM)}{(MFM)} = (SAF)(ERDM)$$

= Displacer mixture mass air to fuel ratio at maximum torque;

Any consistent system of units can be used in these approximate relations;
   d. For the FIG. 3 example form of the invention, where a cam and return spring are used to drive the displacer piston, the following approximate relation can be used for sizing the displacer air supply and fuel supply:

$$\frac{(MDAD)}{(MFM)} = \frac{(AD)(ed))(AR)(CR)(KM)(das)(ACA)}{(VDF)(AF)(CF)(KF)(df)(FCA)}$$

Wherein:
(KM)=Retraction rate constant for the drive cam, 58, retraction distance per cam revolution;
(AD)=Area of displacer piston, 55;
(ed)=Displacer volumetric efficiency, fractional
(das)=Engine intake air density in the engine intake manifold, 54;
The crank angle duration of air flow (ACA), and fuel flow (ACF), at maximum torque, need not be pi radians, as shown on the related timing diagrams of FIG. 4, for this FIG. 3 form of the invention on a two stroke cycle engine.

Any consistent system of units can be used in these approximate relations.
Having thus described my invention, what I claim is:
1. In a piston internal combustion engine comprising: at least one combined means for compressing and expanding gases, each said combined means comprising an internal combustion engine mechanism comprising a variable volume chamber for compressing and expanding gases, and drive means for driving said internal combustion engine mechanism and varying the volume of said chamber through repeated cycles; said variable volume chamber comprising a combustion chamber end at the minimum volume portion of said variable volume;
   each said variable volume cycle comprising a compression time interval, when said variable volume is sealed and decreasing, followed by an expansion time interval, when said variable volume is sealed and increasing, these two time intervals together being a compression and expansion time interval;
   each said combined means for compressing and expanding further comprising intake means for admitting reactant gases into said variable volume chamber prior to each said compression time interval, and an intake manifold connecting said intake means to a source of engine intake air; exhaust means for removing reacted gases from said variable volume chamber after each said expansion time interval; and ignition means for igniting fuel air mixtures within said variable volume chamber;
   each said variable volume cycle further comprising an exhaust time interval when said variable volume is opened to said exhaust means, followed by an intake time interval when said variable volume is opened to said intake means, these two time intervals being an exhaust and intake time interval; said exhaust and intake time interval following after a preceding expansion time interval and preceding a next following compression time interval; said piston internal combustion engine further comprising a source of supply of reactant gas containing appreciable oxygen gas, such as air, to each said intake means for admitting reactant gases into said variable volume chamber, each cycle of said variable volume chamber further comprising a potential combustion time interval comprising that portion of said compression and expansion time interval during which fuel from any source, and reactant gas containing appreciable oxygen gas, are both present within said variable volume chamber; each cycle of said variable volume chamber further comprising a combustion time interval during which the fuel and oxygen contents of the variable volume chamber are ignited and burned therein;
   each said variable volume cycle thus comprises the following sequence of time intervals, in time order; a compression time interval; a potential combustion time interval, a portion of which is a combustion time interval; an expansion time interval; an exhaust time interval; an intake time interval; and these variable volume cycles are repeated;
   wherein the improvement comprises adding a sufficient number of intake stratifiers to said internal combustion engine so that each said variable volume chamber is served by one intake stratifier apparatus; each said intake stratifier apparatus comprising:
   a moveable displacer piston, sealably operative within a stationary displacer cylinder, and these enclosing a displacer volume;
   a displacer piston driver means for moving said displacer piston, in a retraction direction to increase said displacer volume, and in a delivery direction to decrease said displacer volume;
   a driver timer means for timing the moving of said displacer piston, relative to said variable volume cycle timing, so that:

said displacer piston moves in said retraction direction, in a retraction motion, commencing after the ending of each prior engine intake time interval, and ending no later than the starting of each next following engine intake time interval;

said displacer piston moves in said delivery direction, in a delivery motion, commencing during each engine intake time interval, and ending no later than the end of that same engine intake time interval;

said retraction motion, followed by said delivery motion, occurs during each variable volume cycle;

a source of fuel;

fuel injector means for transferring fuel from said source, and injecting it into said displacer volume, while said retraction motion is occurring, and comprising; injector adjustment means for adjusting the quantity of fuel injected into said displacer volume during each variable volume cycle, said fuel quantity being adjusted in response to required engine torque output;

a source of displacer air;

air injector means for transferring air from said displacer air source, and injecting it into said displacer volume while said retraction motion is occurring;

said transfer of fuel, and transfer of air, into said displacer volume, during said retraction motion, creating a displacer mixture of fuel and air within said displacer volume, during each variable volume cycle;

an engine intake manifold connected to said engine intake means so that engine intake air entering into said engine variable volume chamber, during said intake time interval, flows through said engine intake manifold;

at least one displacer mixture transfer passage, between said displacer volume and said engine intake manifold, each said transfer passage comprising a displacer mixture transfer valve and actuator means for opening and closing said displacer mixture transfer passage, so that said displacer mixture can be transferred into said engine intake manifold, whenever said displacer mixture transfer valve is open, and said delivery motion is also occurring;

each said displacer mixture transfer passage connecting separately into said engine intake manifold, at a point where the volume of that portion of said intake manifold between said point and said engine intake means, is much less than the maximum volume of said variable volume chamber;

a sensor of variable volume cycle timing;

an engine torque regulator;

controller means for controlling said fuel injector means, said air injector means, said displacer mixture transfer valve and actuator, and responsive to said variable volume cycle timing sensor and said engine torque regulator, so that:

fuel is injected into said displacer volume during said retraction motion of said displacer piston;

air is injected into said displacer volume during said retraction motion of said displacer piston;

displacer mixture is transferred from said displacer volume, into said engine intake manifold during said delivery motion of said displacer piston;

the fuel quantity thusly injected into said displacer volume, per engine cycle is proportioned to required engine torque output.

2. In a piston internal combustion engine, as described in claim 1, wherein said controller means further controlling said displacer mixture transfer valves and actuators, so that said displacer mixture is transferred, from said displacer volume into said engine intake manifold, as at least two separate pulses per variable volume cycle;

whereby a stratified engine intake mixture is created in said intake manifold.

3. In a piston internal combustion engine as described in claim 2:

wherein said air injector means, and said fuel injector means, further comprise displacer mixture ratio adjustment means for adjusting the mass ratio of fuel to air of said displacer fuel in air mixture;

and further wherein said controller means is additionally operative upon said displacer mixture ratio adjustment means, so that;

said displacer mixture is fuel richer than the stoichiometric mixture ratio of the fuel.

4. In a piston internal combustion engine as described in claim 3, and further comprising:

a source of compressor air;

wherein said source of displacer air comprises an air tank into which an air compressor pumps air from said compressor air source.

5. In a piston internal combustion engine as described in claim 4;

wherein said controller means additionally controls said fuel injector and said air injector so that said injection of fuel into said displacer volume occurs concurrently with said injection of air into said displacer volume.

6. In a piston internal combustion engine, as described in claim 3:

wherein said source of displacer air is said engine intake manifold.

said piston internal combustion engine further comprising an intake supercharger means for increasing the pressure of air in said engine intake manifold.

7. In a piston internal combustion engine as described in claim 6:

wherein said controller means additionally controls said fuel injector and said air injector so that said injection of fuel into said displacer volume occurs concurrently with said injection of air into said displacer volume.

8. In a piston internal combustion engine as described in claim 2;

wherein said controller means further controls said air injector means, and said fuel injector means, so that the ratio of instantaneous fuel injection rate to instantaneous air injection rate, varies during each displacer piston retraction motion.

9. In an internal combustion engine as described in claim 8:

wherein said air injector means and said fuel injector means, further comprise displacer mixture ratio adjustment means for adjusting the mass ratio of fuel to air of said displacer fuel in air mixture;

and further wherein said controller means is additionally operative upon said displacer mixture ratio adjustment means, so that;

said displacer mixture is fuel richer than the stoichiometric mixture ratio of the fuel.

10. In an internal combustion engine as described in claim 9 and further comprising:

a source of compressor air;

wherein said source of displacer air comprises an air tank into which an air compressor pumps air from said compressor air source.

11. In a piston internal combustion engine as described in claim 9:

wherein said source of displacer air is said engine intake manifold;

said piston internal combustion engine further comprising an intake supercharger means for increasing the pressure of air in said engine intake manifold;

12. In a piston internal combustion engine as described in claim 1;

wherein said controller means further controls said air injector means, and said fuel injector means, so that, the ratio of instantaneous fuel injection rate, to instantaneous air injection rate, varies during each displacer piston retraction motion;

whereby a stratified engine intake mixture is created in said intake manifold.

13. In a piston internal combustion engine as described in claim 1:

wherein said controller means further controls said displacer mixture transfer valves and actuators, so that: displacer mixture transfer, from said displacer volume, into said engine intake manifold, commences later than the start of said intake time interval, and ceases earlier than the end of said intake time interval;

whereby a stratified engine intake mixture is created, which comprises at least two fuel free, air only, portions, the first portion to enter the variable volume chamber, and the last portion to enter the variable volume chamber, during said intake time interval.

14. In a piston internal combustion engine as described in claim 13:

wherein said air injector means and said fuel injector means further comprise displacer mixture ratio adjustment means for adjusting the mass ratio of fuel to air of said displacer fuel in air mixture;

and further wherein said controller means is additionally operative upon said displacer mixture ratio adjustment means, so that;

said displacer mixture is fuel richer than the stoichiometric mixture ratio of the fuel.

15. In a piston internal combustion engine as described in claim 14: wherein;

said controller means further controlling said displacer mixture transfer valves and actuators, so that said displacer mixture is transferred from said displacer volume into said engine intake manifold, as at least two separate pulses per variable volume cycle.

16. In a piston internal combustion engine as described in claim 15;

wherein said controller means further controls said air injector means and said fuel injector means, so that the ratio of instantaneous fuel injection rate, to instantaneous air injection rate, varies during each displacer piston retraction motion.

17. In a piston internal combustion engine as described in claim 14;

wherein said controller means further controls said air injector means and said fuel injector means, so that the ration of instantaneous fuel injection rate, to instantaneous air injection rate, varies during each displacer piston retraction motion.

* * * * *